(12) United States Patent
Maestle

(10) Patent No.: US 7,110,119 B2
(45) Date of Patent: Sep. 19, 2006

(54) DETERMINING AN OPTICAL PROPERTY BY USING SUPERIMPOSED DELAYED SIGNALS

(75) Inventor: Ruediger Maestle, Boeblingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 215 days.

(21) Appl. No.: 10/695,689

(22) Filed: Oct. 29, 2003

(65) Prior Publication Data

US 2004/0130724 A1 Jul. 8, 2004

(30) Foreign Application Priority Data

Nov. 15, 2002 (EP) .................................. 02025426

(51) Int. Cl.
*G01B 9/02* (2006.01)
(52) U.S. Cl. ...................... 356/484; 356/477; 356/481

(58) Field of Classification Search ................ 356/517, 356/491, 73.1, 481, 484, 477
See application file for complete search history.

(56) References Cited

U.S. PATENT DOCUMENTS 6,486,961 B1 * 11/2002 Szfraniec et al. ........... 356/477
6,606,158 B1 * 8/2003 Rosenfeldt et al. ......... 356/477

FOREIGN PATENT DOCUMENTS

EP       1 202 038      2/2002

* cited by examiner

*Primary Examiner*—Hwa Andrew Lee
*Assistant Examiner*—Marissa J Detschel

(57) ABSTRACT

An optical property of a device under test is determined from a detected DUT response signal, or a signal derived therefrom, whereby the DUT response signal represents a signal response of the DUT in response to a composite signal or a signal derived from said composite signal. The composite signal comprises superimposed signals delayed with respect to each other.

19 Claims, 5 Drawing Sheets

DETERMINING AN OPTICAL PROPERTY BY USING SUPERIMPOSED DELAYED SIGNALS

BACKGROUND OF THE INVENTION

1. Field of the Invention

The present invention relates to the determination of an optical property of a device under test (DUT) by analyzing a response signal of said DUT, or a signal derived therefrom.

2. Brief Description of Related Developments

According to a known technique commonly referred to as "swept homodyne interferometry", a DUT is implemented in one of the interferometer arms of an interferometric measurement set-up introducing an additional wavelength dependent optical path length. A laser source is swept over a range of wavelengths. Due to a discrepancy of the arm lengths a modulated signal—the interferogram—is observed at a detector. The set-up is comparable to a Mach-Zehnder set-up when viewed in transmission, and to a Twyman-Green interferometer when viewed in reflection. More details concerning this approach can be found in "Phase and Group Delay Relation in Swept Homodyne Interferometry" by Thomas Jensen, and in EP-A-1202038 by the assignee, the teaching thereof shall be incorporated herein by reference.

SUMMARY OF THE INVENTION

It is an object of the invention to improve the determination of an optical property by analyzing a DUT response signal, or a signal derived therefrom. The object is solved by the independent claims. Preferred embodiments are shown by the dependent claims.

The invention relates to an apparatus adapted for determining an optical property of a device under test (DUT). The apparatus comprises a delay unit that forms a composite signal, whereby said composite signal comprises superimposed signals that are delayed with respect to each other. The DUT response signal representing a signal response of the DUT in response to the composite signal, or in response to a signal derived from said composite signal, is detected. The apparatus further comprises a first determination unit that determines an optical property of the DUT from said DUT response signal, or from a signal derived therefrom.

The composite signal comprises at least two superimposed signals. When the DUT response to said composite signal, or to a signal derived from said composite signal, is detected and analyzed, it is possible to find out how the composite signal is modified by said DUT. Instead of analyzing the DUT response to a simple signal, e.g. to a signal comprising only one signal component, the DUT response to a composite signal is used for determining an optical property of the DUT. The composite signal comprises different signal components that are affected by said DUT in different ways. The use of a composite signal allows to collect much more information per measurement, because each of the various components of said composite signal might be affected by said DUT in a different way. For example, said composite signal might comprise different frequency components that interfere with each other. By detecting the DUT response to a composite signal of this kind, it is possible to obtain information about the DUT response at different frequencies with one single measurement.

Another advantage of providing a composite signal to the DUT is that the measurement set-up is considerably simplified. The delay unit is connected to the DUT input, and the DUT output is connected to the first determination unit. Because the composite signal already comprises several signal components, it is not necessary any longer to provide an extra reference signal to the determination unit.

The invention can be used both for single-port and for multi-port devices. A multi-port device might for example comprise several input ports, whereby the input signals provided at said input ports are combined to at least one output signal comprising several channels. A multi-port device might as well comprise several output ports, whereby the various channels of an input signal are distributed to said output ports. For multi-port devices comprising several input ports, the composite signal can be provided to each of said input ports by establishing fiber connections between the delay unit and each of said input ports. The output ports are connected to one or more determination units. For a measurement set-up of this kind, it is especially advantageous that no reference signals are required, because all the necessary signal components are contained within the composite signal.

Another advantage of preferred embodiments is that the mechanical stability of the simplified set-up is improved, and that distortions due to vibrations are reduced.

According to a preferred embodiment, the superimposed signals that are used for forming the composite signal are derived from one incident signal. When said signal components are derived from one common source, they have a well-defined phase relation relative to each other.

According to another preferred embodiment of the invention, the incident optical signal is generated by a tunable light source, and preferably by a narrow-band tunable laser source. The frequency of the light generated by the tunable light source can be varied as a function of time, for example, the frequency of said light might be swept over a certain range of frequencies. In this case, the relative delay between the superimposed signals causes a frequency difference between the superimposed signals. Therefore, the composite signal comprises different frequency components that interfere with each other, and the composite signal comprises an interference signal. This interference signal, or a signal derived therefrom, can be provided to the DUT. By detecting and analyzing the DUT response signal, or a signal derived therefrom, it is possible to find out how the interference pattern of the composite signal is affected by said DUT. By comparing the interference pattern of the composite signal with the interference pattern of the response signal, it is possible to gather information about the optical properties of the DUT. For example, information concerning the DUT's dispersion and the frequency dependence of the DUT's refractive index can be obtained.

According to another preferred embodiment of the invention, the incident optical signal is split up into at least two different light paths, said light paths having different optical path lengths. When said superimposed signals are delayed by different optical paths, there is a relative delay of said superimposed signals with respect to each other.

According to a preferred embodiment of the invention, the DUT response signal is either an optical signal transmitted through said DUT, or an optical signal reflected by said DUT. Preferably, the apparatus comprises a first and a second determination unit for simultaneously detecting both the signal transmitted through said DUT and the signal reflected by said DUT. This allows comparing the transmitted and the reflected intensity, and the correspondence of the transmitted and the reflected intensity can be understood. This is especially helpful for understanding the optical properties of more complex optical devices, such as for example the properties of a Fabry-Perot-Etalon.

According to a preferred embodiment of the invention, the respective optical property is obtained by analyzing the phase of the interference pattern obtained in response to said composite signal. This can for example be done by setting up a mathematical model of the phase, whereby a set of fit parameters is adjusted during a fitting procedure. By doing this, the various contributions to the phase can be distinguished.

From the time dependent intensity of the DUT response signal, for example, the insertion loss of the DUT might be determined. This can be done by relating the intensity of the response signal to the composite signal's intensity. Besides that, the frequency dependence of the group delay might be determined by analyzing the phase of the DUT response signal. For example, the way the interference pattern of the DUT response signal is modified by the DUT permits to derive the variation of the group delay $\tau_{group}$ as a function of frequency. The invention is not limited to these examples, though. Any phase properties of the DUT or loss or gain properties of the DUT might be determined.

According to another preferred embodiment of the invention, the incident signal is swept with a predefined sweep speed $v_f$ over a range of wavelengths. In this case, the frequency separation $\Delta f$ can be related to the relative delay $\Delta T$ by means of the equation $\Delta f = \Delta T \cdot v_f$. In case of a constant sweep speed $v_f$, the frequency separation $\Delta f$ is constant as well.

According to another preferred embodiment of the invention, the frequency separation $\Delta f$ between the signal components of the composite signal is varied by varying the sweep speed $v_f$. Thus, it is possible to adapt the frequency separation $\Delta f$ to the respective determination unit that is used in the set-up. Furthermore, the frequency resolution of the measurement can be adjusted in accordance with the user's needs. For example, in case of a broad band device, a rather high sweep speed might be chosen, while in case of a narrow band device, the frequency is e.g. swept slowly. The sweep speed can be varied on part of the tunable laser source, and therefore, the delay lines of the various light paths don't have to be modified. According to an alternative embodiment, the frequency separation $\Delta f$ is changed by modifying at least one variable delay in at least one of said light paths.

In another preferred embodiment, at least one of the light paths comprises a polarization controller for optimizing the contrast of the detected interference pattern. A high-quality interference pattern is obtained when the polarization states of the various frequency components are substantially equal to each other.

According to another preferred embodiment of the invention, the time dependent intensity of the DUT response signal, or of a signal derived therefrom, is recorded for different frequency separations $\Delta f_1$, $\Delta f_2$, etc. From the variety of interference patterns, the various contributions that affect the DUT response signal can be understood and distinguished from each other.

According to another preferred embodiment of the invention, the apparatus comprises a reference determination unit adapted for performing a reference measurement of the composite signal, or of a signal derived from said composite signal. There might occur variations of the intensity of said composite signal, or, in case a frequency sweep is performed, of the sweep speed $v_f$, that cause measurement errors. By performing a reference measurement of the composite signal, it is possible to consider these variations when determining the desired optical property. Besides that, the frequency separation $\Delta f$ between different frequency components of the composite signal (or of a signal derived therefrom) can be determined by analyzing the phase of said composite signal. During further analysis, the knowledge of $\Delta f$ might be helpful.

According to another preferred embodiment of the invention, the apparatus further comprises an optical modulator that is inserted at any position of the light path between the tunable light source and the determination unit. Said modulator, modulates the respective optical signal with an external frequency. As a result, each frequency component of the respective optical signal is shifted by said external frequency. An appropriate choice of the external frequency allows shifting said frequency components to any desired range of frequencies, which might simplify the detection of said frequency components.

According to a further preferred embodiment of the invention, the incident signal is split up into at least three different optical signals, whereby the light path of the first signal and the light path of the third signal each comprise a polarization controller. The first optical signal is set to a first polarization state, and the third optical signal is set to a second polarization state. Besides that, said first and said third signal are delayed with respect to the second signal. When the three signals are combined to form a composite signal, the second signal interferes with the delayed first signal, thereby generating a first interference pattern, and the second signal also interferes with the third signal, thereby producing a second interference pattern. For this reason, the composite signal comprises two interference patterns that oscillate within two different planes of polarization. This embodiment of the invention allows finding out how the DUT modifies an interference pattern in dependence on the pattern's respective state of polarization.

According to another preferred embodiment of the invention, the first determination unit comprises a polarization diversity receiver. A polarization diversity receiver detects how the polarization of a received interference pattern is oriented. For this purpose, the polarization diversity receiver might for example comprise a polarization dependent beam splitter and a set of power meters for detecting the signal intensity for different directions of polarization. By performing a polarization resolved measurement of the DUT response signal, or of a signal derived therefrom, it is possible to analyze how the polarization of the composite signal affects the way that signal is modified by the DUT. For example, the DUT might rotate the state of polarization of the composite signal. A polarization diversity receiver allows understanding polarization dependent effects within the DUT.

The invention can be partly or entirely embodied or supported by one or more suitable software programs, which can be stored on or otherwise provided by any kind of data carrier, and which might be executed in or by any suitable data processing unit. Software programs or routines are preferably applied for controlling the tunable light source, e.g. for performing frequency sweeps. Furthermore, software programs or routines might be applied for analyzing the phase of a detected interference pattern.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF EMBODIMENTS OF THE INVENTION

Figure 1:
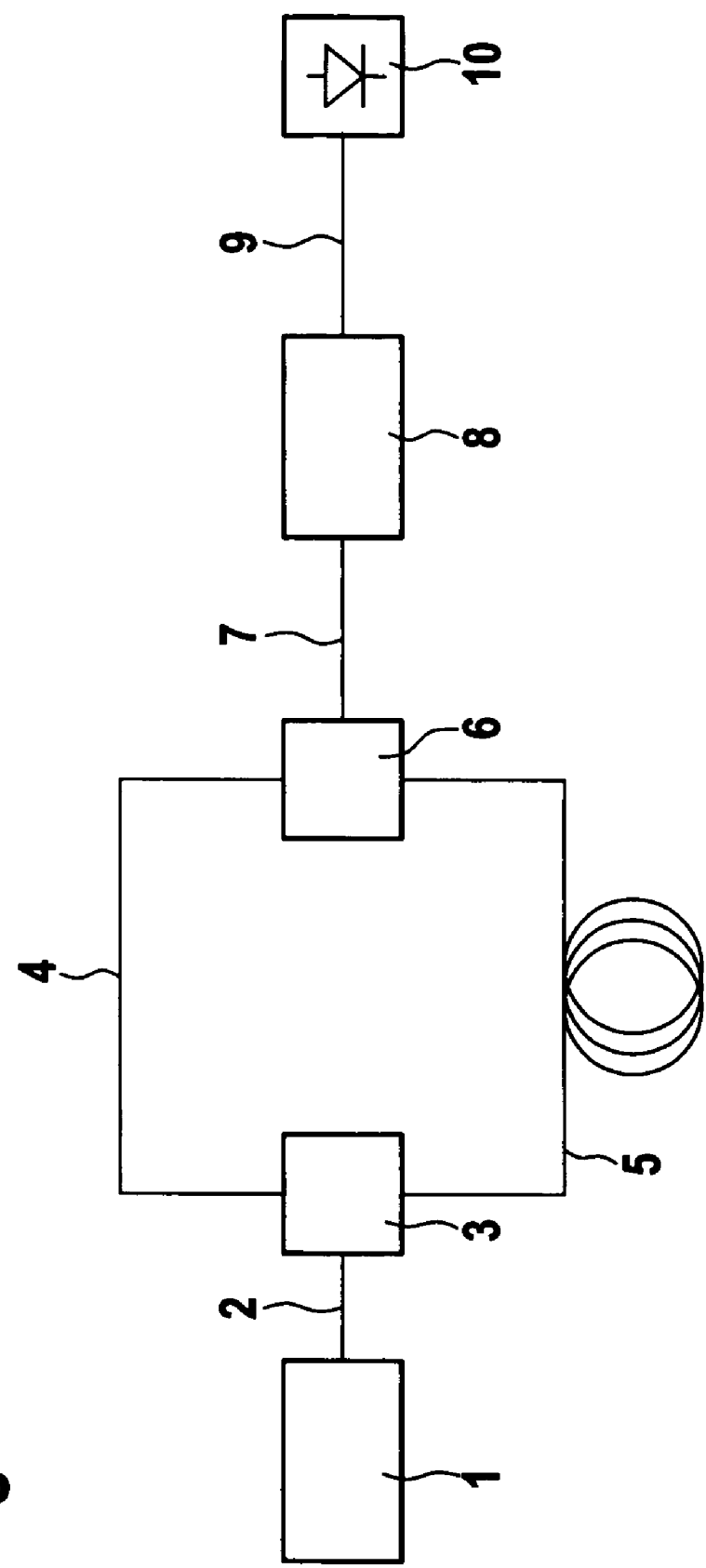
FIG. 1 shows a first embodiment to to determine an optical property by using superimposed delayed signals.

FIG. 1 shows the basic measurement set-up of the invention. A tunable laser source 1 emits a beam of light 2, whereby the frequency of the emitted light is swept over a range of wavelengths. The emitted light is forwarded to a beam splitter 3 that may be fiber optic or bulk optic. The beam splitter 3 splits the beam of light 2 into a signal 4 of a first light path and into a signal 5 of a second light path. In case the light paths are realized by means of optical fibers with a refractive index $n_{fiber}$, the optical path length of the first light path is ($n_{fiber} \cdot L_1$), while the optical path length of the second light path is ($n_{fiber} \cdot L_2$), whereby $L_1$ and $L_2$ denote the respective lengths of the optical fibers. The optical path lengths of the first light path and the second light path differ by ($\Delta L \cdot n_{fiber}$), whereby $\Delta L = L_2 - L_1$. The beam combiner 6 receives a first delayed signal via the first light path and a second delayed signal via the second light path. The first delayed signal is delayed by $$T_1 = \frac{n_{fiber} \cdot L_1}{c},$$

the second delayed signal is delayed by $$T_2 = \frac{n_{fiber} \cdot L_2}{c},$$

and therefore, the relative time delay $\Delta T = T_2 - T_1$ between said two signals can be written as $$\Delta T = \frac{n_{fiber} \cdot (L_2 - L_1)}{c} = \frac{n_{fiber} \cdot \Delta L}{c} \quad (1)$$

The first and the second delayed signal are superimposed, and a composite signal 7 is obtained. The composite signal 7 is incident upon the DUT 8, and at the DUT output, a transmitted signal 9 is obtained. The intensity of the transmitted signal 9 is recorded, as a function of time, by the power meter 10.

During a frequency sweep, the frequency of the emitted beam of light 2 is continuously increased according to the formula $$f(t) = f_0 + v_f t \quad (2)$$

whereby $v_f$ is the sweep speed of the tunable laser source, and whereby $f_0$ is the starting frequency. Alternatively, the frequency f(t) of the emitted light might as well be continuously decreased with time. In terms of wavelength, the sweep speed might be $$40 \frac{nm}{sec}, 1000 \frac{nm}{sec},$$

or even greater than $$1000 \frac{nm}{sec}.$$

In case a tunable laser source is used that emits light in the infrared, the starting frequency $f_0$ might for example be in the order of 193 THz.

In the following, it is assumed that the tunable laser source 1 shown in FIG. 1 generates a beam of light 2 with a frequency that continuously increases with time. The optical path length of the first light path is smaller than the optical path length of the second light path, and accordingly, the time delay $T_1$ is smaller than the time delay $T_2$. For this reason, the frequency obtained at the output of the first light path is greater than the frequency obtained at the output of the second light path. The additional time delay $\Delta T$ in the second light path is the reason for a frequency difference $\Delta f$ between the first delayed signal and the second delayed signal.

Figure 2:
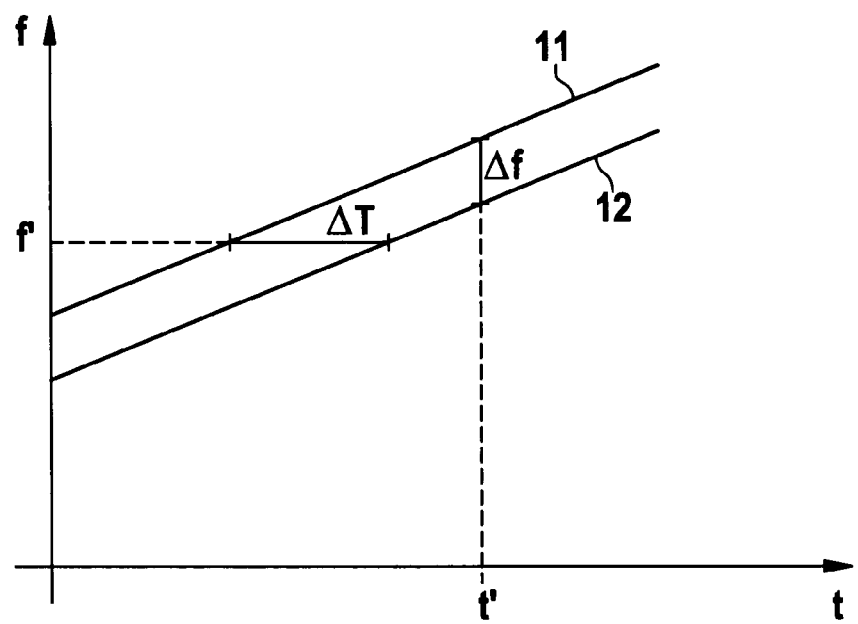
FIG. 2 depicts the two frequency components of the DUT input signal as a function of time.

In FIG. 2, both the time dependence 11 of the first delayed signal's frequency and the time dependence 12 of the second delayed signal's frequency is shown. From the above formula (2), it can be seen that the slope of each of the two curves is determined by the sweep speed $v_f$. The path difference $\Delta L$ between the two optical paths corresponds to an additional time delay $\Delta T$ within the second light path. After having received light of the frequency f' via the first light path, one has to wait for an additional period of time $\Delta T$ until light of the same frequency f' can be received via the second light path. When comparing the frequencies of the first delayed signal and of the second delayed signal at a certain point of time t', there will always be a well-defined frequency difference $\Delta f$ between said two signals. This frequency difference depends both on the additional time delay $\Delta T$ and on the sweep speed $v_f$:

$$\Delta f = \Delta T \cdot v_f = \frac{n_{fiber} \cdot \Delta L \cdot v_f}{c} \quad (3)$$

This frequency difference $\Delta f$ gives rise to interference when the delayed signals of the first and the second light paths are superimposed, and the composite signal 7 of FIG. 1 is modulated according to the frequency difference $\Delta f$. The path difference between the first an the second light path might for example be of the order $\Delta L = 200$ m, the refractive index $n_{fiber}$ might for example be equal to 1.5, and accordingly, the frequency difference $\Delta f$ might for example be 5 MHz.

The composite signal 7 with its well-defined interference pattern is now incident upon the device under test 8, and said DUT 8 will modify said interference pattern in a way that is characteristic for said DUT.

Figure 3:
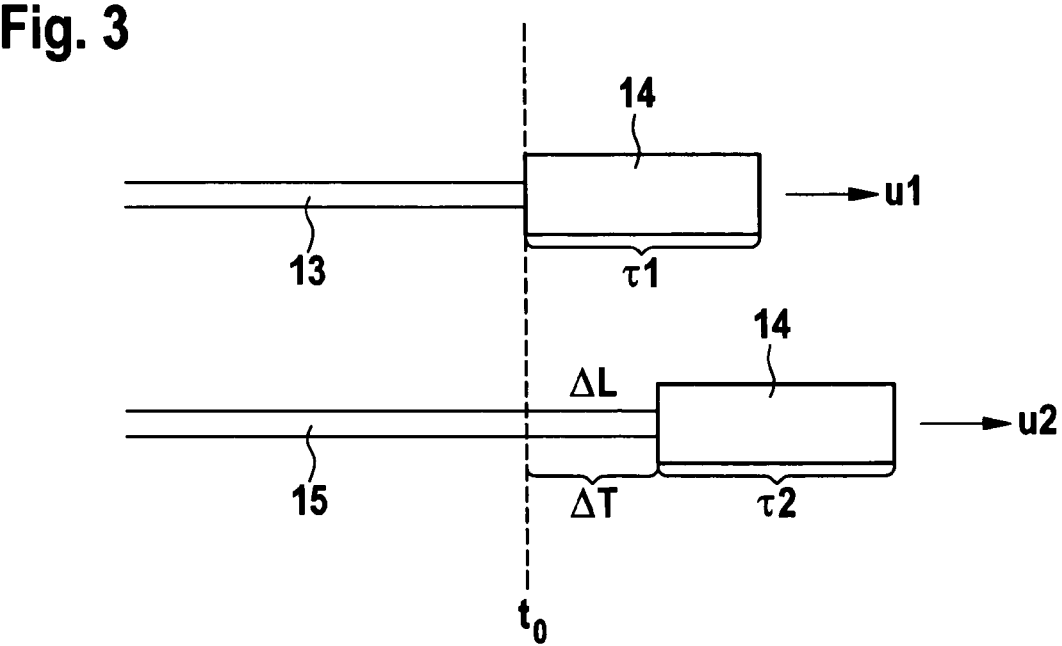
FIG. 3 shows how the interference pattern at the output of the DUT can be derived.

The phase of the interference pattern detected at the output of the DUT can be derived analytically. FIG. 3 shows how the interferometric set-up of FIG. 1 can be related to a mathematical model. In the upper part of FIG. 3, the first light path of the interferometer is shown. At the point of time $t_0$, the light exits the optical fiber 13 and enters the DUT 14. Then, for the traversal of the DUT 14, a time period $\tau 1$ is required. The lower part of FIG. 3 corresponds to the second light path of the interferometric set-up shown in FIG. 1. The length of the second light path exceeds the length of the first light path. At the time $t_0$, when the light of the first light path has already reached the DUT 14, the light in the second light path still has to traverse the additional length $\Delta L = L_2 - L_1$ of the optical fiber 15 before the DUT 14 is reached. This length difference $\Delta L$ corresponds to the additional delay $\Delta T$ as given in the above formula (1). During the time period $\Delta T$, the frequency sweep has continued, whereby the frequency difference $\Delta f$ that corresponds to the additional delay $\Delta T$ is determined according to the above formula (3). For this reason, the time period $\tau 2$ required for traversing the DUT 14 might differ from the time period $\tau 1$, because the frequency has changed in the meantime, and because, due to dispersion, the DUT's refractive index might depend on frequency.

At the output of the DUT 14, two light waves u1 and u2 are obtained that can be expressed as follows:

$$u1 = a1 \cdot \exp[2\pi i \cdot f(t_0 - \tau 1) \cdot (t_0 + \tau 1)]$$

$$u2 = a2 \cdot \exp[2\pi i \cdot f(t_0 - \Delta T - \tau 2) \cdot (t_0 + \Delta T + \tau 2)] \quad (4)$$

From these expressions for the light waves u1 and u2, the time dependence of the power detected by the power meter can be derived:

$$P(t_0) = |u1 + u2|^2 = a1^2 + a2^2 + 2 \cdot a1 \cdot a2 \cdot \cos[2\pi \cdot f(t_0 - \tau 1) \cdot (t_0 + \tau 1) - 2\pi \cdot f(t_0 - \Delta T - \tau 2) \cdot (t_0 + \Delta T + \tau 2)] \quad (5)$$

The terms $a1^2$ and $a2^2$ are constant, and therefore, the interference pattern detected by the power meter is caused by the cosine term. In the following, the phase $\phi(t_0)$ of said cosine term will be analyzed more closely. The phase $\phi(t_0)$ can be written as follows:

$$\frac{1}{2\pi}\varphi(t) = = [f(t - \tau 1) - f(t - \Delta T - \tau 2)] \cdot t + f(t - \tau 1) \cdot \tau 1 - f(t - \Delta T - \tau 2) \cdot (\Delta T + \tau 2) \quad (6)$$

When assuming that the frequency sweep is performed in a way that the frequency increases as a function of time, the frequency $f(t - \tau 1)$ will be larger than $f(t - \Delta T - \tau 2)$. In case the DUT exhibits normal dispersion, the refractive index $n_{DUT}$ of the DUT will increase with increasing frequency. When the refractive index $n_{DUT}$ is large, the time of traversal $\tau$ will become large as well. This leads to the conclusion that in case the DUT exhibits normal dispersion $\Delta \tau = \tau 1 - \tau 2$ will be greater than zero. The quantity $\Delta \tau$ can be seen as a measure for the dispersion of the DUT. Of course, $\Delta \tau$ might as well assume negative values.

Usually, the path difference $\Delta L$ between the first and the second light path is chosen such that the frequency difference $\Delta f$ assumes a value within the desired range. For example, when $\Delta L = 200$ m, $\Delta T$ will be in the order of microseconds, and $\Delta f$ will be in the order of 5 MHz. Different orders of magnitude might be used as well. Anyway, the relation $\Delta \tau \ll \Delta T$ generally holds, and for this reason, the frequency difference at the DUT output is approximately equal to $\Delta f$:

$$f(t_0 - \tau 1) - f(t_0 - \Delta T - \tau 2) \approx \Delta f \quad (7)$$

When inserting $\Delta \tau$ and $\Delta f$ in the above formula (6), the following expression for the phase $\phi(t_0)$ is obtained:

$$\frac{1}{2\pi}\varphi(t) = \Delta f \cdot t + f(t - \tau 1) \cdot \tau 1 - (f(t - \tau 1) + \Delta f) \cdot (\Delta T + \tau 2) \quad (8)$$

$$\frac{1}{2\pi}\varphi(t) = \Delta f \cdot t + f(t - \tau 1) \cdot \Delta \tau - f(t - \tau 1) \cdot \Delta T - \Delta f \cdot \Delta T - \Delta f \cdot \tau 2$$

In this expression for the phase of the interference pattern, five terms can be identified. The fourth term ($\Delta f \cdot \Delta T$) is a constant and does not depend on time. The fifth term ($\Delta f \cdot \tau 2$) is very small, because both $\Delta f$ and $\tau 2$ are small. Besides that, $\tau 2$ does not strongly depend on time.

The first term ($\Delta f \cdot t$) linearly increases with time, whereby $\Delta f$ can be considered as a constant in the order of 5 MHz. The sweep speed $v_f$ might for example be 5 THz/sec, and the additional time delay $\Delta T$ might be in the order of microseconds. Due to the frequency sweeping, the frequency $f(t - \tau 1)$ in the second and third term of the above formula (8) also shows a linear dependence on time.

The quantity $\Delta \tau$ is the change of the time of traversal $\tau$ over the frequency interval $\Delta f$. This variation of the traversal time $\tau$ with frequency is caused by the variation of the DUT's refractive index with frequency. Thus, $\Delta \tau$ allows tracing the dispersion of the DUT.

The meaning of the second term of the above formula (8) becomes clearer by rewriting this term as follows:

$$\Delta f \cdot \left[ f(t - \tau 1) \cdot \frac{\Delta \tau}{\Delta f} \right] \quad (9)$$

The group delay $\tau_{group}$ of the DUT can be written as:

$$\tau_{group} = \left( f(t) \cdot \frac{d\tau_{phase}}{df} + \tau_{phase} \right) \approx \left( f(t) \cdot \frac{\Delta \tau}{\Delta f} + \tau_{phase} \right) \quad (10)$$

Therefore, the second term of the phase $\phi(t)$ in formula (8) can be identified as the difference between the group delay $\tau_{group}$ and the phase delay $\tau_{phase}$.

Figure 4:
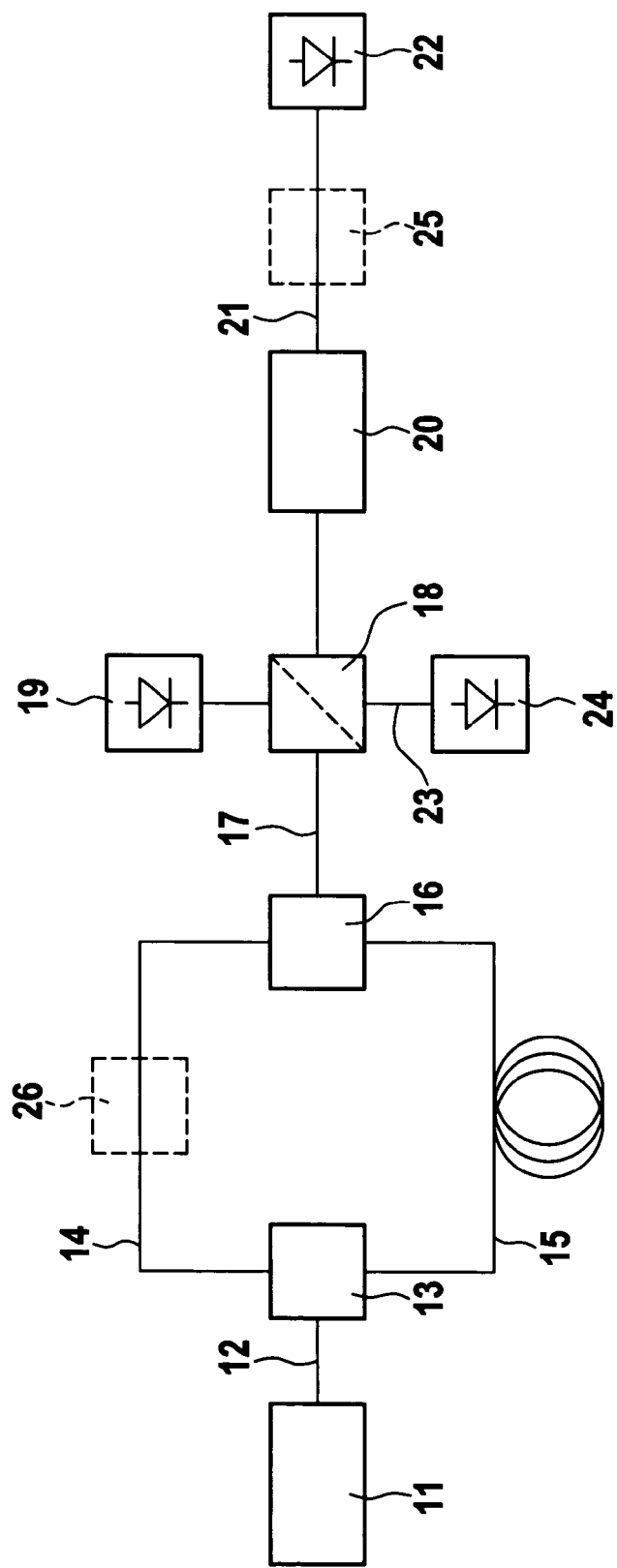
FIG. 4 depicts a second embodiment of the invention.

Especially for more complex devices, for example for devices like a Fabry-Perot-Etalon, it makes sense to record both the transmitted and the reflected signal. In FIG. 4, a second embodiment comprising a corresponding measurement set-up is shown. A tunable laser source 11 generates an incident signal 12, which is split up, by the beam splitter 13, into a first signal for the first light path 14 and a second signal for the second light path 15, whereby the second light path 15 comprises an extra delay. In the beam combiner 16, the signals of the first and the second light path are superimposed to form a composite signal 17 that is provided to a beam splitter 18. Preferably, a 3 dB beam splitter is used that reflects approximately 50% of the incoming light's intensity to a reference determination unit 19. The reference determination unit 19 records a reference interference pattern, and from the phase of said reference interference pattern, the frequency separation $\Delta f$ between the first and the second delayed signal can be determined. The determination of $\Delta f$ from the reference determination pattern is useful for analyzing the various contributions to the phase $\phi(t)$ of formula (8). Furthermore, the intensity of the composite signal 17 can be determined, and this intensity can be used as a reference when determining the insertion loss or the insertion gain of the DUT 20.

The remaining intensity of the composite signal 17 is incident upon the DUT 20. In a power meter 22, the intensity of the transmitted signal 21 is determined as a function of time. The signal reflected by the DUT 20 is partly transmitted and partly reflected by the beam splitter 18, and the intensity of the reflected signal 23 is determined by a power meter 24. In the embodiment shown in FIG. 4, the beam splitter 18 is both responsible for reflecting part of the composite signal 17 to the power meter 19 and for forwarding the reflected signal 23 to the power meter 24. Instead of using one beam splitter 18 for these two tasks, two separate beam splitters might as well be applied.

In order to distinguish the different contributions to the phase φ(t) in formula (8), it is helpful to record the interference patterns for at least two different frequency separations $\Delta f_1$, $\Delta f_2$, etc. The frequency separation $\Delta f$ can be expressed as $\Delta f = \Delta T \cdot v_f$. According to a first method for varying the frequency separation $\Delta f$, the sweep speed $v_f$ of the tunable laser source is varied, while the delay $\Delta T$ between the two light paths is kept constant:

$$\Delta f_1 = \Delta T \cdot v_{f1}$$

$$\Delta f_2 = \Delta T \cdot v_{f2} \quad (11)$$

According to a second method for varying the frequency separation $\Delta f$, the additional delay $\Delta T$ between the first and the second light path is changed. This can for example be done by modifying the length of the second light path, for example by adding an additional delay line. The larger the extra delay $\Delta T$ is chosen, the larger the frequency separation $\Delta f$ will be:

$$\Delta f_1 = \Delta T_1 \cdot v_f$$

$$\Delta f_2 = \Delta T_2 \cdot v_f \quad (12)$$

Furthermore, it is possible to combine the first and the second method for varying $\Delta f$. The respective values of $\Delta f$ can always be determined by a reference measurement of the composite signal's interference pattern.

The light paths for detecting the interference patterns might additionally comprise at least one optical modulator. In FIG. 4, an optical modulator 25 is depicted (with dashed lines) that has been inserted between the DUT 20 and the power meter 22. The optical modulator might as well be inserted at any other position within the light paths. The respective input signal of the modulator, e.g. the DUT output signal 21, is modulated with an external frequency f, and all the frequency components of said signal are shifted by said frequency f. The optical modulator 25 can either be implemented as an acoustic optical modulator (AOM), or as an electrical optical modulator (EOM). A certain frequency component can be shifted to any desired frequency range, and there, said frequency component can be detected by means of a suitable determination unit.

Furthermore, a polarization controller might be added to at least one of the light paths. FIG. 4 shows a polarization controller 26 (with dashed lines) that has been added to the first light path 14. The polarization controller 26 changes the polarization of the first light path's signal in a way that at the input of the beam combiner 16, the polarization of the first light path's signal is substantially equal to the polarization of the second light path's signal. When the polarization in both paths is identical, the best contrast of the interferograms is obtained. For example, in case both signals oscillate within the same plane of polarization, the contrast of the interferogram reaches its optimum. According to an alternative embodiment, the contrast of the interferograms can be optimized by using polarizationmaintaining fibers both in the first and the second light path. Also in this case, the states of polarization of the signals received via the different light paths are substantially identical at the input of the beam combiner 16.

Figure 5:
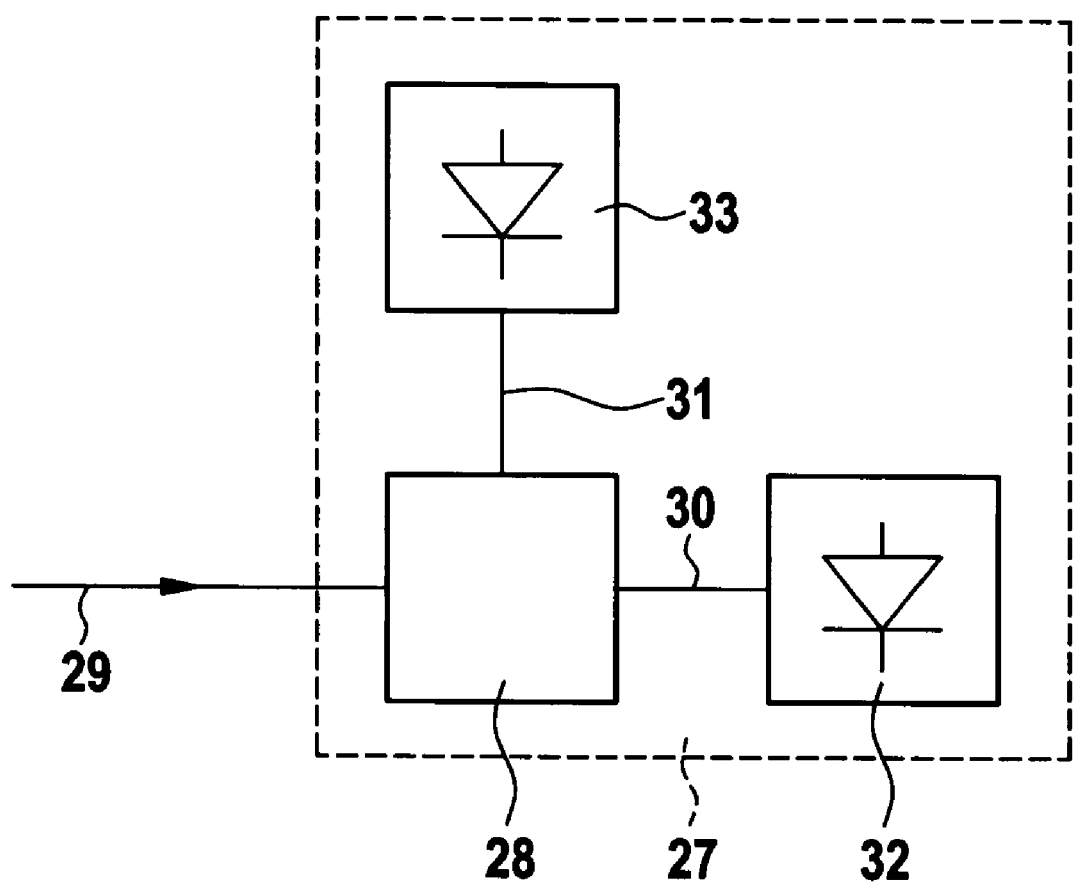
FIG. 5 shows a polarization diversity receiver that allows for a polarization resolved detection.

The state of polarization of the transmitted signal 21 or of the reflected signal 23 can be analyzed with a polarization diversity receiver. Any one of the power meters 19, 22, 24 can be replaced by such a polarization diversity receiver. Besides recording the respective signal's intensity as a function of time, a polarization diversity receiver also permits to determine the received signal's polarization state. FIG. 5 shows a polarization diversity receiver 27 comprising a polarization dependent beam splitter 28 that splits up the received signal 29 into a first signal 30 with a first state of polarization, and into a second signal 31 with a second state of polarization. Furthermore, the polarization diversity receiver 27 comprises two power meters, whereby the first power meter 32 detects the time dependence of the first signal 30, and whereby the second power meter 33 records the intensity of the second signal 31 as a function of time. From the two interference patterns recorded by the power meters 32, 33, the state of polarization of the received signal 29 can be derived.

Figure 6:
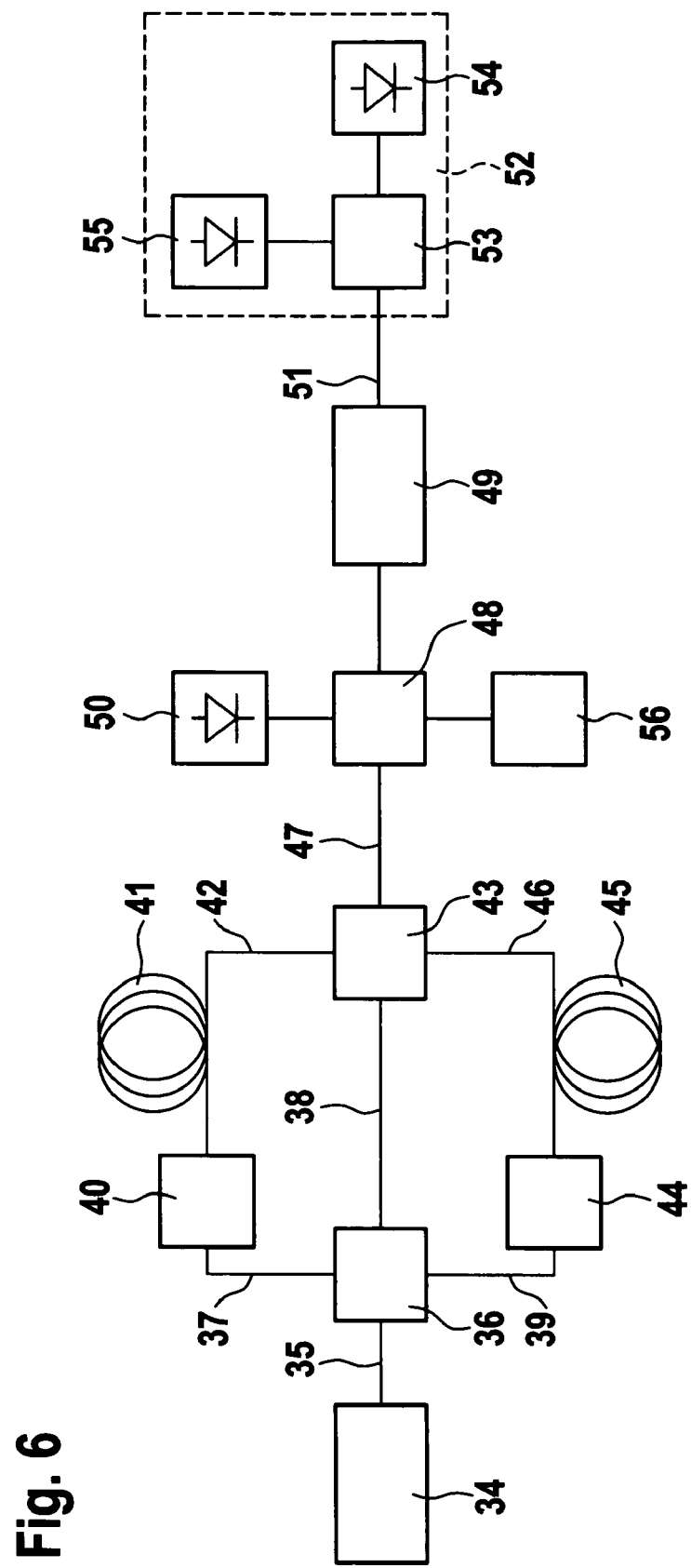
FIG. 6 shows a third embodiment of the invention.

In FIG. 6, a third embodiment of the invention is shown that is especially helpful for analyzing how the state of polarization of a signal incident upon a DUT is modified by said DUT. The tunable laser source 34 generates a signal 35, whereby the frequency of said signal is continuously swept over a range of wavelengths. The beam splitter 36 splits up the signal 35 into a first signal 37 of a first light path, a second signal 38 of a second light path, and a third signal 39 of a third light path. The first light path comprises a polarization controller 40 and an additional delay line 41. At the input of the beam combiner 43, a delayed signal 42 is received from the first light path. The polarization controller 40 modifies the state of polarization of the first signal 37 in a way that the delayed signal 42 is polarized in a plane of polarization oriented at −45°. The third light path comprises a polarization controller 44 and an additional delay line 45. Here, the polarization controller 44 modifies the polarization state of the third signal 39 in a way that the delayed signal 46 at the input of the beam combiner 43 is polarized in a plane of polarization oriented at +45°. In the beam combiner 43, the second signal 38 and the delayed signals 42, 46 are superimposed, and a composite signal 47 is obtained.

For understanding the composite signal 47, it is helpful to think of the second signal 38 as being composed of two different components, whereby the first component of the signal 38 is polarized in a −45° direction, and whereby the second component is polarized in a +45° direction. The frequency of the signal 35 is continuously swept with a sweep frequency $v_f$, and therefore, the delay line 41 in the first light path causes a frequency separation $\Delta f$ between the signal 38 and the delayed signal 42. Because of this frequency separation, the delayed signal 42 interferes with the first component of the signal 38 in a plane of polarization oriented at −45°. The composite signal 47 therefore comprises a first interference pattern that oscillates in a plane of polarization oriented at −45°. Similarly, the delay line 45 in the third light path causes a frequency separation $\Delta f$ between the signal 38 and the delayed signal 46 and therefore, the second component of the signal 38 interferes with the delayed signal 46 in a polarization plane oriented at +45°.

The composite signal 47 therefore comprises two interference patterns, whereby the first interference pattern oscillates in a plane of polarization oriented at −45°, and whereby the second interference pattern oscillates in a plane of polarization oriented at +45°.

The composite signal 47 is forwarded, via the beam splitter 48, to the DUT 49. The beam splitter 48 provides the composite signal 47 to the reference determination unit 50. There, the interference patterns are analyzed, and the frequency separation $\Delta f$ is determined. At the output of the DUT 49, a transmitted signal 51 is obtained, and this transmitted signal 51 is detected and analyzed by a determination unit. In the embodiment shown in FIG. 6, the transmitted signal 51 is analyzed by a polarization diversity receiver 52 comprising a polarization dependent beam splitter 53 and two power meters 54, 55 for recording the interference patterns of the transmitted signal 51 as a function of time. This permits to analyze how the DUT 49 modifies an interference pattern in dependence on the plane of polarization of said interference pattern. Furthermore, it is possible to track any rotations of the interference patterns that are caused by the DUT 49. The signal reflected by the DUT 49 is partly reflected by the beam splitter 48 and arrives at a determination unit 56. Preferably, also the determination unit 56 is a polarization diversity receiver.

What is claimed is:

1. An apparatus for determining an optical property of a device under test—DUT—, comprising:
    a delay unit for providing a composite signal comprising superimposed signals delayed with respect to each other and that interfere with each other; and
    a first determination unit for determining the optical property of the DUT from a detected DUT response signal, or a signal derived therefrom, wherein the DUT response signal represents a signal response of the DUT in response to the composite signal or a signal derived therefrom,
    wherein the delay unit derives the superimposed signals from an incident optical signal, and
    wherein said incident optical signal is swept in frequency with a predefined sweep speed over a frequency tuning range.

2. The apparatus of claim 1, further comprising a tunable light source for providing the incident optical signal.

3. The apparatus of claim 1, wherein the delay unit comprises:
    a beam splitting unit for splitting the incident optical signal into at least two optical signals comprising a first optical signal and a second optical signal;
    at least two different light paths for delaying said optical signals with respect to each other, in order to obtain at least two delayed signals; and
    a beam-combining unit for forming the composite signal by superimposing said delayed signals.

4. The apparatus of claim 3, wherein at least one of said light paths comprises at least one of:
    a variable delay line for varying a frequency separation $\Delta f$ between said delayed signals, and
    a polarization controller for adjusting a polarization of at least one of said delayed signals.

5. The apparatus of claim 3, wherein
    said first beam splitting unit splits the light of said tunable light source into at least three optical signals comprising said first optical signal, said second optical signal and a third optical signal,
    wherein the light path of said first optical signal comprises a polarization controller that sets the polarization of said first optical signal to first polarization state, and
    wherein the light path of said third optical signal comprises a polarization controller that sets the polarization of said third optical signal to a second polarization state.

6. The apparatus of claim 1, wherein said DUT response signal is at least one of: an optical signal transmitted through said DUT, and an optical signal reflected by said DUT.

7. The apparatus of claim 1, further comprising a second determination unit, whereby said first determination unit detects an optical signal transmitted through said DUT, and whereby said second determination unit detects an optical signal reflected by said DUT, or vice versa.

8. The apparatus of claim 1, wherein the optical property is determined by analyzing an interference pattern of said DUT response signal.

9. The apparatus of claim 1, wherein the optical property is at least one of a group comprising phase properties of the DUT or loss or gain properties respectively of the DUT.

10. The apparatus of claim 1, further comprising a reference determination unit for performing a reference measurement of said composite signal, or of a signal derived therefrom.

11. The apparatus of claim 1, wherein said first determination unit comprises a polarization diversity receiver for detecting an interference pattern in dependence on the state of polarization of said DUT response signal, or of a signal derived therefrom.

12. The apparatus of claim 1, further comprising a tunable laser source for providing the incident optical signal.

13. An apparatus for determining an optical property of a device under test—DUT—, comprising:
    a delay unit for providing a composite signal comprising superimposed signals delayed with respect to each other and that interfere with each other; and
    a first determination unit for determining the optical property of the DUT from a detected DUT response signal, or a signal derived therefrom, wherein the DUT response signal represents a signal response of the DUT in response to the composite signal or a signal derived therefrom,
    wherein a frequency separation $\Delta f$ between said delayed signals is varied by varying a sweep speed for sweeping the incident optical signal in frequency.

14. An apparatus for determining an optical property of a device under test—DUT—, comprising:
    a delay unit for providing a composite signal comprising superimposed signals delayed with respect to each other and that interfere with each other; and
    a first determination unit for determining the optical property of the DUT from a detected DUT response signal, or a signal derived therefrom, wherein the DUT response signal represents a signal response of the DUT in response to the composite signal or a signal derived therefrom,
    wherein a first interference pattern is detected for a first frequency separation $\Delta f_1$ between said delayed signals, and wherein a second interference pattern is detected for a second frequency separation $\Delta f_2$ between said delayed signals.

15. An apparatus for determining an optical property of a device under test—DUT—, comprising:
    a delay unit for providing a composite signal comprising superimposed signals delayed with respect to each other and that interfere with each other; and a first determination unit for determining the optical property of the DUT from a detected DUT response signal, or a signal derived therefrom, wherein the DUT response signal represents a signal response of the DUT in response to the composite signal or a signal derived therefrom, wherein a frequency separation $\Delta f$ between said delayed signals is determined by analyzing a reference interference pattern of said composite signal, or of a signal derived therefrom.

16. An apparatus for determining an optical property of a device under test—DUT—, comprising:
   a delay unit for providing a composite signal comprising superimposed signals delayed with respect to each other and that interfere with each other;
   a first determination unit for determining the optical property of the DUT from a detected DUT response signal, or a signal derived therefrom, wherein the DUT response signal represents a signal response of the DUT in response to the composite signal or a signal derived therefrom; and
   an optical modulator for modulating said composite signal, or said DUT response signal, or a signal derived from said signals, with an external frequency.

17. A method for determining an optical property of a device under test—DUT—, comprising:
   providing a composite signal by superimposing signals delayed with respect to each other so that they interfere with each other;
   detecting a DUT response signal, wherein the DUT response signal represents a signal response of the DUT in response to the composite signal or a signal derived therefrom;
   determining the optical property of the DUT from the detected DUT response signal or a signal derived therefrom;
   splitting an incident signal into at least two optical signals comprising a first optical signal and a second optical signal; and
   individually delaying said optical signals via at least two different light paths in order to obtain said delayed signals.

18. A method for determining an optical property of a device under test—DUT—, comprising:
   providing a composite signal by superimposing signals delayed with respect to each other so that they interfere with each other;
   detecting a DUT response signal, wherein the DUT response signal represents a signal response of the DUT in response to the composite signal or a signal derived therefrom;
   determining the optical property of the DUT from the detected DUT response signal or a signal derived therefrom; and
   sweeping the frequency of an incident signal over a frequency tuning range.

19. A method for determining an optical property of a device under test—DUT—, comprising:
   providing a composite signal by superimposing signals delayed with respect to each other so that they interfere with each other;
   detecting a DUT response signal, wherein the DUT response signal represents a signal response of the DUT in response to the composite signal or a signal derived therefrom;
   determining the optical property of the DUT from the detected DUT response signal or a signal derived therefrom; and
   repeating at least once the measurement with a different state of polarization of the superimposed signal.

* * * * *